United States Patent
Haque et al.

(10) Patent No.: US 11,236,020 B2
(45) Date of Patent: Feb. 1, 2022

(54) SYNTHETIC SOURCE ROCKS

(71) Applicant: Saudi Arabian Oil Company, Dhahran (SA)

(72) Inventors: Mohammad Hamidul Haque, Houston, TX (US); Younane N. Abousleiman, Norman, OK (US); Katherine Leigh Hull, Houston, TX (US); David Jacobi, Spring, TX (US); Yanhui Han, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 624 days.

(21) Appl. No.: 15/968,982

(22) Filed: May 2, 2018

(65) Prior Publication Data

US 2018/0319708 A1    Nov. 8, 2018

Related U.S. Application Data

(60) Provisional application No. 62/500,282, filed on May 2, 2017.

(51) Int. Cl.
*C04B 18/12*    (2006.01)
*C04B 26/26*    (2006.01)
(Continued)

(52) U.S. Cl.
CPC ............ *C04B 26/26* (2013.01); *C04B 18/125* (2013.01); *C04B 28/00* (2013.01); *C04B 28/006* (2013.01);
(Continued)

(58) Field of Classification Search
CPC ....... C04B 26/26; C04B 28/00; C04B 28/006; C04B 28/02; C04B 28/24; C04B 40/0021
See application file for complete search history.

(56) References Cited

U.S. PATENT DOCUMENTS

| 2,900,269 A | 8/1959 | Bauman et al. |
| 2,904,445 A * | 9/1959 | Sellers ...................... C04B 7/44 |
| | | 106/757 |

(Continued)

FOREIGN PATENT DOCUMENTS

| CN | 101819111 | 12/2011 |
| CN | 1621803 | 5/2012 |

(Continued)

OTHER PUBLICATIONS

International Search Report and Written Opinion issued in International Application No. PCT/US2018/030201 dated Jul. 19, 2018, 15 pages.

(Continued)

*Primary Examiner* — Michael P Wieczorek
(74) *Attorney, Agent, or Firm* — Fish & Richardson P.C.

(57) ABSTRACT

Methods and systems for fabricating synthetic source rocks with organic materials, for example, using high energy resonant acoustic mixing technology, are provided. An example method includes preparing one or more organic components including kerogen, mixing, by utilizing resonant acoustic waves, the one or more organic components with one or more inorganic components to obtain a mixture, and processing the mixture to fabricate a synthetic source rock. Another example method includes mixing one or more organic components and one or more inorganic components with a kerogen precursor as an organic binder to obtain a mixture including artificial kerogen and processing the mixture to fabricate a synthetic source rock. One or more mechanical or chemo-mechanical properties of the synthetic source rock can be characterized as one or more functions of the one or more organic components and the one or more inorganic components.

19 Claims, 3 Drawing Sheets

(51) Int. Cl.

| | | |
|---|---|---|
| *C04B 28/00* | (2006.01) | |
| *C04B 28/02* | (2006.01) | |
| *C04B 28/24* | (2006.01) | |
| *C04B 40/00* | (2006.01) | |
| C04B 111/54 | (2006.01) | |
| B29D 99/00 | (2010.01) | |
| B29B 7/00 | (2006.01) | |

(52) U.S. Cl.
CPC .............. *C04B 28/02* (2013.01); *C04B 28/24* (2013.01); *C04B 40/0021* (2013.01); *B29B 7/00* (2013.01); *B29D 99/00* (2013.01); *C04B 2111/54* (2013.01)

(56) References Cited

U.S. PATENT DOCUMENTS

| | | |
|---|---|---|
| 3,284,281 A | 11/1966 | Thomas |
| 3,716,387 A | 2/1973 | Simmons et al. |
| 3,807,557 A | 4/1974 | Miller |
| 3,926,575 A | 12/1975 | Meyers |
| 4,043,885 A | 8/1977 | Yen et al. |
| 4,220,550 A | 9/1980 | Frenier et al. |
| 4,252,189 A | 2/1981 | Bodine |
| 4,289,639 A | 9/1981 | Buske |
| 4,324,560 A | 4/1982 | Fonseca |
| 4,381,950 A | 5/1983 | Lawson |
| 4,444,058 A | 4/1984 | Ratigan |
| 4,587,739 A | 5/1986 | Holcomb |
| 4,594,170 A | 6/1986 | Brown et al. |
| 4,640,692 A | 2/1987 | Audeh |
| 5,193,396 A | 3/1993 | Gorski |
| 5,302,297 A | 4/1994 | Barthrope |
| 5,435,187 A | 7/1995 | Ewy |
| 5,757,473 A | 5/1998 | Kanduth et al. |
| 5,869,750 A | 2/1999 | Onan |
| 5,999,887 A | 12/1999 | Giannakopoulos et al. |
| 6,138,760 A | 10/2000 | Lopez et al. |
| 6,516,080 B1 | 2/2003 | Nur |
| 6,749,022 B1 | 6/2004 | Fredd |
| 6,866,048 B2 | 3/2005 | Mattox |
| 6,947,843 B2 | 9/2005 | Fisher et al. |
| 7,098,663 B1 | 8/2006 | Bader |
| 7,344,889 B2 | 3/2008 | Kelemen et al. |
| 7,369,980 B2 | 5/2008 | Deffenbaugh et al. |
| 7,526,418 B2 | 4/2009 | Pita et al. |
| 7,565,831 B2 | 7/2009 | Miyahara |
| 8,165,817 B2 | 4/2012 | Betancourt et al. |
| 8,352,228 B2 | 1/2013 | Walters et al. |
| 8,380,437 B2 | 2/2013 | Abousleiman et al. |
| 8,701,788 B2 | 4/2014 | Wigand et al. |
| 8,839,860 B2 | 9/2014 | Wigand et al. |
| 8,851,177 B2 | 10/2014 | Wigand |
| 8,868,385 B2 | 10/2014 | Fertig et al. |
| 8,936,089 B2 | 1/2015 | Wigand |
| 9,869,649 B2 | 1/2018 | Hull et al. |
| 2005/0060130 A1 | 3/2005 | Shapiro et al. |
| 2005/0103118 A1 | 5/2005 | Workman |
| 2006/0047489 A1 | 3/2006 | Scheidt et al. |
| 2006/0092766 A1 | 5/2006 | Shelley et al. |
| 2006/0265204 A1 | 11/2006 | Wallis et al. |
| 2007/0203677 A1 | 8/2007 | Awwiller |
| 2007/0298979 A1 | 12/2007 | Perry et al. |
| 2008/0006410 A1 | 1/2008 | Looney et al. |
| 2008/0059140 A1 | 3/2008 | Salmon et al. |
| 2008/0070806 A1 | 3/2008 | Lin et al. |
| 2009/0071239 A1 | 3/2009 | Rojas et al. |
| 2009/0087912 A1 | 4/2009 | Ramos et al. |
| 2009/0193881 A1 | 8/2009 | Finnberg |
| 2009/0248309 A1 | 10/2009 | Nelville et al. |
| 2010/0010106 A1 | 1/2010 | Crews |
| 2010/0049625 A1 | 2/2010 | Biebesheimer et al. |
| 2010/0051511 A1 | 3/2010 | Faerman |
| 2010/0186520 A1 | 7/2010 | Wheeler |
| 2010/0213579 A1 | 8/2010 | Henry |
| 2010/0224365 A1 | 9/2010 | Abad |
| 2010/0279136 A1 | 11/2010 | Bonucci |
| 2011/0257944 A1 | 10/2011 | Du et al. |
| 2012/0193578 A1 | 8/2012 | Pan et al. |
| 2012/0247774 A1 | 10/2012 | Li et al. |
| 2012/0261617 A1 | 10/2012 | Pan et al. |
| 2013/0084643 A1 | 4/2013 | Conunarieu et al. |
| 2013/0160994 A1 | 6/2013 | Alsop et al. |
| 2013/0213120 A1 | 8/2013 | Lebedev |
| 2013/0228019 A1 | 9/2013 | Meadows |
| 2013/0231908 A1 | 9/2013 | Williams et al. |
| 2013/0233536 A1 | 9/2013 | Alqam |
| 2013/0269933 A1 | 10/2013 | Pomerantz et al. |
| 2013/0310492 A1* | 11/2013 | Morgan .................. C08L 95/00 524/59 |
| 2014/0008305 A1 | 1/2014 | Nichols et al. |
| 2014/0048694 A1 | 2/2014 | Pomerantz |
| 2014/0116710 A1 | 5/2014 | Naser-El-Din et al. |
| 2014/0231077 A1 | 8/2014 | Rivero et al. |
| 2014/0260694 A1 | 9/2014 | Szlendak |
| 2014/0271321 A1* | 9/2014 | Maderud ............... B22F 1/0048 419/12 |
| 2014/0374104 A1 | 12/2014 | Kushal |
| 2015/0152724 A1 | 6/2015 | Amendt |
| 2015/0293256 A1 | 10/2015 | Dusterhoft |
| 2016/0103047 A1 | 4/2016 | Liu |
| 2016/0103049 A1 | 4/2016 | Liu |
| 2017/0066959 A1 | 3/2017 | Hull et al. |
| 2017/0067836 A1 | 3/2017 | Hull et al. |

FOREIGN PATENT DOCUMENTS

| | | |
|---|---|---|
| CN | 102183410 | 5/2014 |
| CN | 105445440 | 3/2016 |
| EP | 2480625 | 4/2013 |
| EP | 2480626 | 4/2013 |
| WO | 9728098 | 8/1997 |
| WO | WO 199728098 | 8/1997 |
| WO | 2002064702 | 8/2002 |
| WO | 2004005435 | 1/2004 |
| WO | 2008001218 | 1/2008 |
| WO | 2010138914 | 12/2010 |
| WO | 2011035292 | 3/2011 |
| WO | 2011035294 | 3/2011 |
| WO | 2012051647 | 4/2012 |
| WO | 2012087887 | 6/2012 |
| WO | 2013149122 | 10/2013 |
| WO | 2015097116 | 7/2015 |
| WO | 2015181028 | 12/2015 |
| WO | 2015200060 | 12/2015 |
| WO | 2017136641 | 8/2017 |

OTHER PUBLICATIONS

Gulf Cooperation Council Examination Report issued in GCC Application No. GC 2018-35234 dated Nov. 20, 2019, 3 pages.

"Field-Deployable Solution for Nanoporosity Measurements in Mud Logging Operations and a Novel Method for Fracability Analysis Using Mud Cuttings," Agilent Technologies, Oct. 2013, 44 pages.

Abad et al., "Evaluation of the Material Properties of the Multilayered Oxides formed on HCM12A using New and Novel Techniques," Manuscript Draft, Manuscript No. OXID-D-15-00019, published in 2015, 44 pages.

Abousleiman et al., "A Micromechanically Consistent Poroviscoelasticity Theory for Rock Mechanics Applications," Int. J. Rock Mech. Min. Sci. & Geomech. Abstr., vol. 30, No. 7, published in 1993, 4 pages.

Abousleiman et al., "Anisotropic Porothermoelastic Solution and Hydro-Thermal Effects on Fracture Width in Hydraulic Fracturing," Int. J. Numer. Anal. Meth. Geomech., published in 2013, 25 pages.

Abousleiman et al, "Poroviscoelastic Analysis of Borehole and Cylinder Problems," ACTA Mechanica, vol. 119, published in 1996, 21 pages.

Abousleiman et al., "SPE 110120: Geomechanics Field and Laboratory Characterization of Woodford Shale: The Next Gas Play,"

(56) References Cited

OTHER PUBLICATIONS

SPE International, SPE 110120, presented at the 2007 SPE Annual Technical Conference and Exhibition on Nov. 11-14, 2007, 14 pages.
Abousleiman et al., "Mandel's Problem Revisited," Geotechnique, 46, No. 2, published in 1996, 9 pages.
Abousleiman et al., "Mechanical Characterization of Small Shale Samples subjected to Fluid Exposure using the Inclined Direct Shear Testing Device," Int. J. Rock Mech. & Min. Sci., vol. 47, No. 3, published in 2010, 13 pages.
Abousleiman et al., "Poroelastic Solutions in Transversely Isotropic Media for Wellbore and Cylinder," Int. J. Solids Structures, vol. 35, Nos. 34-35, published in 1998, 25 pages.
Abousleiman et al., "SPE 124428: GeoMechanics Field Characterization of the Two Prolific U.S. Mid-West Gas Plays with Advanced Wire-Line Logging Tools," SPE International, presented at the 2009 SPE Annual Technical Conference and Exhibition, Oct. 4-7, 2009, 19 pages.
Abousleiman et al., "The Granular and Polymer Composite Nature of Kerogen-Rich Shale," Acta Geotechnica, Feb. 5, 2016, 24 pages.
Agenet et al., "SPE 157019: Fluorescent Nanobeads: a First Step Toward Intelligent Water Tracers," Society of Petroleum Engineers, SPE International Oilfield Nanotechnology conference, Jun. 12-14, 2012, 13 pages.
Allan et al., "A Multiscale Methodology for the Analysis of Velocity Anisotropy in Organic-Rich Shale," Geophysics, vol. 80, No. 4, Jul.-Aug. 2015, 16 pages.
Altowairqi, "Shale elastic property relationships as a function of total organic carbon content using synthetic samples," Journal of Petroleum Science and Engineering vol. 133, Sep. 2015, 9 pages.
Ananthan et al., "Influence of Strain Softening on the Fracture of Plain Concrete Beams," Int. J. of Fracture, vol. 45, published in 1990, 25 pages.
Anisimov, "SPE 118862: The Use of Tracers for Reservoir Characterization," Society of petroleum Engineers (SPE), presented at SPE Middle East Oil and Gas Show and Conference, Mar. 15-18, 2009, 8 pages.
Aslan et al., "Fluorescent Core—Shell AG@$SiO_2$ Nanocomposites for Metal-Enhanced Fluorescence and Single Nanoparticle Sensing Platforms," Jan. 19, 2007, 2 pages.
Ballice, "Solvent Swelling Studies of Goynuk (Kerogen Type-I) and Beypazari Oil Shales (Kerogen Type-II)," Science Direct, Fuel vol. 82, published in 2003, 5 pages.
Bazant et al., "Deformation of Progressively Cracking Reinforced Concrete Beams," ACI Journal, Technical Paper, Title No. 81-26, vol. 81, No. 3, May-Jun. 1984, 11 pages.
Bazant et al., "Size Effect in Brazilian Split-Cylinder Tests: Mesurements and Fracture Analysis," ACI Materials Journal, vol. 88, No. 3, May 31, 1991; pp. 325-332.
Bazant et al., "Strain-Softening Bar and Beam: Exact Non-Local Solution," Int. J. Solids Structures, vol. 24, No. 7, published in 1988, 15 pages.
Bennett et al., "Instrumented Nanoindentation and 3D Mechanistic Modeling of a Shale at Multiple Scales," Acta Geotechnica, vol. 10, No. 21, Jan. 9, 2015; 14 pages.
Bhandari et al., "Two-Dimensional DEM Analysis of Behavior of Geogrid-Reinforced Uniform Granular Bases under a Vertical Cyclic Load, Acta Geotechnica," published in 2014, 12 pages.
Biot, "General Theory of Three-Dimensional Consolidation," Journal of Applied Physics, vol. 12, No. 2, Feb. 1941, 11 pages.
Bobko et al., "The Nanogranular Origin of Friction and Cohesion in Shale—A Strength Homogenization Approach to Interpretation of Nanoindentation Results," Int. J. Numer. Anal. Meth. Geomech., published in 2010, 23 pages.
Boskey et al., "Perspective—Collagen and Bone Strength," Journal of Bone and Mineral Research, vol. 14, No. 3, published in 1999, 6 pages.
Brochard et al., "Fracture Properties of Kerogen and Importance for Organic-Rich Shales," Annual World Conference on Carbon (Carbon 2013), Jul. 2013, 5 pages.

Bunzil et al., "Taking advantage of luminescent lanthanide ions," Chemical Society Reviews, Dec. 2005, 29 pages.
Carcione and Avseth, "Rock-physics templates for clay-rich source rocks," Geophysics vol. 80, Issue 5, D481-D500, Sep. 2015, 21 pages.
Carter and Hanson, "Fake Moon Dirt, HOOD Solar System Science," UT Dallas Magazine, vol. 6, Issue 2, Spring 2016, 1 page.
Chang et al., "Magnetic SERS Composite Nanoparticles for Microfluidic Detection," 251st ACE National Meeting, Mar. 13-17, 2016, 1 pages.
Chen et al., "Size Effect in Micro-Scale Cantilever Beam Bending, "Acta Mech., published in 2011, 17 pages.
Chen et al., "FITC functionalized magnetic core-shell $Fe_3O_4$/Ag hybrid nanopartrcle for selective determination of molecular biothiols," Elsevier Ltd., Dec. 2013, 7 pages.
Chern et al., "Deformation of Progressively Cracking Partially Prestressed Concrete Beams," PCI Journal, vol. 37, No. 1, published in 1992, 11 pages.
Chuang et al., "Ultra-sensitive in-situ detection of novel near-infrared persistent luminescent tracer nanoagents in crude oil-water mixtures," a natureresearch journal, Scientific Reports, Jun. 15, 2016, 5 pages.
Chupin et al., "Finite Strain Analysis of Nonuniform Deformation Inside Shear Bands in Sands," Int. J. Numer, Anal. Meth. Geomech., published in 2012, 16 pages.
Corapcioglu, "Fracturing Fluid Effects on Young's Modulus and Embedment in the Niobrara Formation," Thesis for degree of Master of Science (Petroleum Engineering), Colorado School of Mines, 2014, 189 pages.
Cubillos et al., "Spe 174394-MS: The Value of Inter-well and Single Well Tracer Technology for De-Risking and Optimizing a CEOR Process—Caracara Field Case," Society of Petroleum Engineers (SPE), presented at EUROPEC 2015, Jun. 1-4, 2015, 19 pages.
Custelcean et al., "Aqueous Sulfate Separation by Crystallization of Sulfate-Water Clusters," Angew. Chem. Int. Ed., published in 2015, vol. 54, pp. 10525-10529.
Daneshy, "Hydraulic Fracturing to Improve Production," Tech 101, TheWayAhead, vol. 6, No. 3, Oct. 2010, 4 pages.
Das et al., "Molecular Fluorescence, Phosphorescence, and Chemiluminescence Spectrometry," Analytical Chemistry, Nov. 3, 2011, 29 pages.
De Block et al., "SPE-177601-MS: A New Solution for the Characterization of Unconventional Shale Resources Based on Analysis or Drill Cutting," SPE International, presented at the Abu Dhabi International Petroleum Exhibition and Conference, Nov. 9-12, 2015, 6 pages.
Deans, "SPE 7076: Using Chemical Tracers to Measure Fractional Flow and Saturation In-Situ," Society of Petroleum Engineers (SPE), presented at SPE Symposium on improved Methods of Oil Recovery, Apr. 16-17, 1978, 10 pages.
Deirieh et al., "Nanochemomechanical Assessment of Shale: A Coupled WDS-Indentation Analysis," Acta Geotechnica, published in 2012, 25 pages.
Delafargue and Ulm, "Explicit approximations of the indentation modulus of elastically orthotropic solids for conical indenters," International Journal of Solids and Structures vol. 41, Issue 26, Dec. 2004, 10 pages.
Devarapalli et al., "Micro-CT and FIB-SEM imaging and pour structure characterization of dolomite rock at multiple scales," Arabian Journal of Geosciences, Aug. 2017, 9 pages.
Du et al., "SPE 93140: Interwell Tracer Tests: Lessons Learnted from past Field Studies," Society of Petroleum Engineers (SPE), presented at SPE Asia Pacific Oil and Gas Conference and Exhibition, Apr. 5-7, 2005, 9 pages.
Ekbote et al., "Porochemoelastic Solution for an Inclided Borehole in a Transversely Isotropic Formation," J. of Eng. Mech., ASCE, Jul. 2006, 10 pages.
El-Aneed et al., "Mass Spectrometry, Review of the Basics: Electrospray, MALDI, and Commonly Used Mass Analyzers," Applied Speclioscopy Reviews, Mar. 16, 2009, 22 pages.

(56) References Cited

OTHER PUBLICATIONS

Elijah, "Numerical Modeling of Wellbore Instability (Tensile Failure) Using Fracture Mechanics Approach," Thesis for the degree of Master of Science, African University of Science and Technology Abuja, May 2013, 77 pages.
Ertas et al., "Petroleum Expulsion Part 1. Theory of Kerogen Swelling in Multicomponent Solvents," Energy & Fuels, published in 2006, 6 pages.
Ewy, "Shale Swelling/Shrinkage and Water Content Change due to Imposed Suction and Due to Direct Brine Contact," Acta Geotechnica, published in 2014, 18 pages.
Frazer et al., "Localized Mechanical Property Assessment of SiC/SiC Composite Materials," Science Direct, Part A 70, published in 2015, 9 pages.
Gao et al., "Materials Become Insensitive to Flaws at Nanoscale: Lessons from Nature," PNAS, vol. 100, No. 10, May 13, 2003, 628 pages.
Gardiner et al., "Practical Raman Spectroscopy," Springer-Verlag, 1989, 9 pages.
Garnero, "The Contribution of Collagen Crosslinks to Bone Strength," Int. Bone & Mineral Society, Sep. 2012, 8 pages.
Georgi et al., "Physics and Chemistry in Nanoscale Rocks", Mar. 22-26, 2015, La Jolla, California, USA, SPE Forum Series; 4 pages.
Glossary.oilfield.slb.com' [online], "Oilfield Glossary: fluid-friction reducer," available on or before Jun. 15, 2017, retrieved from URL< http://www.glossary.oilfield.slb.com/Terms/f/fluid-friction_reducer.aspx>, 1 page.
Glover et al., "ARMA 16-0737: The Use of Measurements Made on Drill Cuttings to Construct and Apply Geomechanical Well Profiles," ARMA, presentation at the 50th US Rock Mechanics/Geomechanics Symposium, Jun. 26-29, 2016, 11 pages.
Han et al., "LBM-DEM Modeling of Fluid-Solid Interaction in Porous Media," Int. J. Numer. Anal. Meth, Geomech., published in 2013, 17 pages.
Han et al., "Numerical Modeling of Elastic Hemispherical Contact for Mohr-Coulomb Type Failures in Micro-Geomaterials," Experimental Mechanics, vol. 57, Jun. 16, 2017, 15 pages.
Han et al., "Application of Silver-Coated Magnetic Microspheres to a SERS-Based Optoflidic Sensor," The Journal of Physical Chemistry (JPCC), Mar. 7, 2011, 7 pages.
Hoang et al., "Correspondence Principle Between Anisotropic Poroviscoelasticity and Poroelasticity using Micromechamcs and Application to Compression of Orthotropic Rectangular Strips," Journal of Applied Physics, American Institute of Physics, vol. 112, Aug. 30, 2012; 16 pages.
Hornby et al., "Anisotropic Effective-Medium Modeling of the Elastic Properties of Shales," Geophysics, vol. 59, No. 10, Oct. 1994, 14 pages.
Hosemann et al., "Mechanical Characteristics of SiC Coating Layer in TRISO Fuel Particles," Journal of Nuclear Materials, vol. 442, published in 2013, 10 pages.
Hosemann et al., "An Exploratory Study to Determine Applicability of Nano-Hardness and Micro-compression Measurments for Yield Stress Estimation," Science Direct, published in 2008, 9 pages.
Hu et al., "Smart Liquid SERS Substrates based on $Fe_3O_4$/Au Nanoparticles with Reversibility Tunable Enhancement Factor for Practical Quantitative Detection," a natureresearch journal, Scientific Reports, Nov. 27, 2014, 10 pages.
Huseby et al., "SPE-169183-MS: High Quality Flow Information from Tracer Data," Society of Petroleum Engineers (SPE), presented at the SPE Bergen One Day Seminar, Apr. 2, 2014, 9 pages.
Hutchins et al., "SPE-21049: Aqueous Tracers for Oilfield Applications," Society of Petroleum Engineers (SPE), presented at SPE International Symposium on Oilfield Chemistry, Feb. 20-22, 1991, 9 pages.
Iqbal et al., "In situ micro-cantilver tests to study fracture properties of NiAl single crystals," Acta Materialia, vol. 60, No. 3, Feb. 2012; 8 pages.

Itasca "Three-dimensional Fast Lagrangian Analysis of Continua (FLAC3D)," available on or before 2012, [retrieved on Jun. 7, 2018], retrieved from URL: < https://www.itascacg.com/software/flac3d>, 4 pages.
Iyengar et al., "Analysis of Crack Propagation in Strain-Softening Beams," Engineering Fracture Mechanics, published in 2002, 18 pages.
Jia et al., "Highly Efficient Extraction of Sulfate Ions with a Tripodal Hexaurea Receptor," Angew. Chem. Int. Ed., published in 2011, vol. 50, pp. 486-490.
Jianhong et al., "Estimation of the Tensile Elastic Modulus using Brazilian disc by Applying Diametrically Opposed Concentrated Loads," International Journal of Rock Mechanics & Mining Sciences, vol. 46, No. 3, published in 2009, 568-576.
Jose et al., "Continuous multi cycle nanoindentation studies on compositionally graded $Ti_{1-x}Al_xN$ multilayer thin films," (XP028230250) Materials Science and Engineering: A, Elsevier, vol. 528, No. 21, Apr. 20, 2011; 7 pages.
Jun et al., "Multifunctional Silver-Embedded Magnetic Nanoparticles as SERS Nanoprobes and Their Applications," Wiley-VCH Verlag GmbH& Co. KGaA, Weinheim, Jan. 4, 2010, 7 pages.
Kelemen et al., "Petroleum Expulsion Part 2. Organic Matter Type and Maturity Effects on Kerogen Swelling by Solvents and Thermodynamic Parameters for Kerogen from Regular Solution Theory," Energy & Fuels, published in 2006, 8 pages.
Kethireddy, "Quantifying the effect of kerogen on Electrical Resistivity Measurements in Organic Rich Source Rocks," Thesis in partial fulfillment of the requirements for the degree of Master of Science, Dec. 2013, 78 pages.
Kim et al., "Numerical analysis of fracture propagation during hydraulic fracturing operations in shale gas systems," International Journal of Rock and Mechanics Mining Sciences vol. 76, 2015.
Kneipp et al., "Single Molecule Detection Using Surface-Enhanced Raman Scattering (SERS)," Physical Review Letters, American Physical Society vol. 78, No. 9, Mar. 3, 1997, 4 pages.
Kolymbas, "Kinematics of Shear Bands," Acta Geotechnica, published in 2009, 4 pages.
Kumar et al., "SPE 159804: Nano to Macro Mechanical Characterization of Shale," SPE International, presented at the SPE Annual Technical Conference and Exhibition, Oct. 8-10, 2012, 23 pages.
Lam et al., "Experiments and Theory in Strain Gradient Elasticity," J. Mech. and Phys. of Solids, published in 2003, 32 pages.
Larsen et al., "Changes in the Cross-Link Density of Paris Basin Toarcian Kerogen During Maturation," Organic Geochemistry, published in 2002, 10 pages.
Laurent Brochard et al.; "Fracture Properties of Kerogen and Importance for Organic-Rich Shales"; Annual World Conference on Carbon (Carbon 2013), Jul. 2013, Rio de Janeiro, Brazil. HAL ID: hal-01274161, 6 pages.
Li et al., "Mechanical Characterization of Micro/Nanoscale Structures for MEMS/NEMS Applications using Nanoindentation Techniques," Science Direct, published in 2003, 775 pages.
Li et al., "The Brazilian Disc Test for Rock Mechanics Applications: Review and New Insights," Rock Mech Rock Eng, published in 2013, 46: pp. 269-287.
Liu, "Dimension effect on mechanical behavior of silicon micro—cantilver beams," Measurement, vol. 41, No. 8, Oct. 2008; 11 pages.
Liu, "Elastic Constants Determination and Deformation Observation Using Brazilian Disk Geometry," Experimental Mechanics, published in 2010, 50: pp. 1025-1039.
Liu, "Fracture Toughness Assessment of Shales by Nanoindentation," Thesis for the degree of Master of Science in Civil Engineering, Geotechnical Engineering Masters Projects, University of Massachusetts Amherst, Sep. 2015, 80 pages.
Liu, "Micro-cantilver Testing to Evaluate the Mechanical Properties of Thermal Barrier Coatings," 19th European Conference on Fracture (ECF19): Fracture Mechanics for Durability, Reliability and Safety; Conference Proceedings held Aug. 26-31, 2012, Kazan, Russia; 7 pages.
Luan et al., "Creation of synthetic samples for physical modelling of natural shale," Geophysical Prospecting vol. 64, Jul. 2016, 17 pages.

(56) References Cited

OTHER PUBLICATIONS

Mahabadi et al., "A novel approach for micro-scale characterization and modeling of geomaterials incorporating actual material heterogeneity," (XP002689941) Geophysical Research Letters, American Geophysical Union, vol. 39, No. 1, L01303, Jan. 1, 2012; 6 pages.
Mahmoud et al., "Removal of Pyrite and Different Types of Iron Sulfide Scales in Oil and Gas Wells without H2S Generation," (IPTC-18279-MS) Presented at the International Petroleum Technology Conference (IPTC), Doha, Qatar, Dec. 6-9, 2015; 8 pages.
Maio et al., "Measuring Fracture Toughness of Coatings using Focused-ion-beam-machined Microbeams," published in 2004, 4 pages.
Marchetti et al., "Fluorous affinity chromatography for enrichment and determrnation of perfluoroalkyl substances," Annual Review of Analytical Chemistry vol. 84, Jul. 19, 2012, 8 pages.
Maxwell, "Microseismic hydraulic fracture imaging: The path toward optimizing shale gas production," The Leading Edge, Mar. 2011, 6 pages.
Mesa, "Spherical and rounded cone nano indenters," Micro Star Technologies Inc., available on or before Jan. 23, 2018, 24 pages.
Montgomery, Carl "Fracturing Fluid Components", Chapter 2, Intech open science | open minds, Montgomery ; licensee Intch. 2013, 21 pages; http://dx.doi.org/10.5772/56422.
Moyer, "A Case for Molecular Recognition in Nuclear Separations: Sulfate Separation from Nuclear Wastes," Inorganic Chemisty, copyright 2012, pp. 3473-3490.
Moyner et al., "The Application of Flow Diagnostics for Reservoir Management," Society of Petroleum Engineers (SPE), Apr. 2015, 18 pages.
Oliver and Pharr, "An improved technique for determining hardness and elastic modulus using load and displacement sensing indentation experiments," Journal of Materials Research, vol. 7, No. 6, Jun. 1992, 20 pages.
Oliver and Pharr, "Measurement of hardness and elastic modulus by instrumented indentation: Advances in understanding and refinements to methodology," Journal of Materials Research, vol. 19, No. 1, Jan. 2004, 18 pages.
Oliver, "An Improved Technique for Determining Hardness and Elastic Modulus using Load and Displacement Sensing Indentation Experiments," published in 1992, 20 pages.
Ortega et al., "The Effect of Particle Shape and Grain-Scale Properties of Shale: A Micromechanics Approach," Int. J. Numer. Anal. Methd. Geomech., published in 2010, 33 pages.
Ortega et al., "The Effect of the Nanogranular Nature of Shale on their Poroelastic Behavior," Acta Geotechnica, published in 2007, 28 pages.
Ortega et al., "The Nanogranular Acoustic Signature of Shale," Geophysics, vol. 74, No. 3, May-Jun. 2009, 20 pages.
Pant, "Nanoindentation characterization of clay minerals and clay-based hybrid bio-geomaterials," dissertation for degree of Doctor of Philosophy in the Department of Civil and Environmental Engineering at the Louisiana State University and Agricultural and Medical College, Dec. 2013, 111 pages.
Passey et al., "From Oil-Prone Source Rock to Gas-Producing Shale Reservoir—Geologic and Petrophysical Characterization of Unconventional Shale-Gas Reservoirs," Society of Petroleum Engineers International, CPS/SPE International Oil & Gas Conference and Exhibition, Beijing, China, Jun. 8-10, 2010, 29 pages.
Petoud et al., "Brilliant SM, Eu, Tb, and Dy Chiral Lanthanide Complexes with Strong Circularly Polarized Luminescence," Journal fo the American Chemical Society (JACS), Dec. 15, 2006, 7 pages.
Podio et al., "Dynamic Properties of Dry and Water-Saturated Green River Shale under Stress," Jun. 11, 1968, SPE 1825, 16 pages.
Pollard, D. D.and Fletcher, R.C., "Fundamentals of Structural Geology," Cambridge University Press, Sep. 1, 2005; p. 291.
Poon et al., "An Analysis of Nanoindentation in Linearly Elastic Solids," International Journal of Solids and Structures, vol. 45, No. 24, Dec. 1, 2008; 16 pages.

Rajbanshi et al., "Sulfate Separation from Aqueous Alkaline Solutions by Selective Crystallization of Alkali Metal Coordination Capsules," Cryst. Growth Des., published in 2011, pp. 2702-2706.
Richard et al., "Slow Relaxation and Compaction of Granular Systems," Nature Materials, vol. 4, Feb. 2005, 8 pages.
Rowan et al., "Dynamic Covalent Chemistry," Angewante Chemie International Edition, Mar. 15, 2002, 55 pages.
Selvin et al., "Principles and biophysical applications of lanthanide-based probes," Annual Review of Biophysics and Biomolecular Structure, Jun. 2002, 28 pages.
Serres-Piole et al., "Water tracers in oilfield applications: Guidelines," Elsevier Ltd., Journal of Science and Engineering, Nov. 2012, 18 pages.
Shahid et al., "Natural-fracture reactivation in shale gas reservoir and resulting microseismicity," Journal of Canadian Petroleum Technology vol. 54.06, 2015.
Shin et al., "Development and Testing of Microcompression for Post Irradiation Characterization of ODS Steels," J. Nuclear Materials, published in 2014, 6 pages.
Shook et al., "SPE 124614: Determining Reservoir Properties and Flood Performance from Tracer Test Analysis," Society of petroleum Engineers (SPE), presented at SPE Annual Technical Confeience and Exhibition, Oct. 4-7, 2009, 19 pages.
Shukla et al., "ARMA 13-578: Nanoindentation Studies on Shales," ARMA, presented at the 47th US Rock Mechanics/Geomechanics Symposium, Jun. 23-26, 2013, 10 pages.
Sierra et al., "Woodford Shale Mechamcal Properties and the Impacts of Lithofacies," ARMA 10-461, copyright 2010, 10 pages.
Singh et al., "Facies classification based on seismic waveform," presented at the 5th Conference & Exposition on Petroleum Geophysics, Jan. 15-17, 2004, 7 pages.
Siskin et al., "Reactivity of organic compounds in hot water: geochemical and technological implications," Science, Oct. 11, 1991, 8 pages.
Slatt et al., "Merging Sequence Stratigraphy and Geomechanics for Unconventional Gas Shales," The Leading Edge, Mar. 2011, 8 pages.
Slatt et al., "Outcrop/Behind Outcrop (Quarry), Multiscale Characterization of the Woodford Gas Shale," copyright 2011, 22 pages.
Sone et al., "Mechanical Properties of Shale-Gas Reservoir Rocks—Part 1: Static and Dynamic Elastic Properties and Anisotropy," Geophysics, vol. 78, No. 5, Sep.-Oct. 2013, 12 pages.
Sone et al., "Mechanical properties of shale-gas reservoir rocks—Part 2: Ductile creep, brittle strength, and their relation to the elastic modulus," 2013, Geophysics, vol. 78, No. 5, 10 pages.
Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 4 pages.
Stiles et al., "Surface-enhanced Raman Spectroscopty," Annual Review of Analytical Chemistry, Mar. 18, 2008, 29 pages.
Tian et al., "Off-Resonant Gold Superstructures as Ultrabright Minimally Invasive Surface-Enhanced Raman Scattering (SERS) Probes," American Chemical Society, Jul. 2015, 7 pages.
Ulm et al., "Material Invariant Poromechanics Properties of Shales," published in 2005, 8 pages.
Ulm et al., "The Nanogranular Nature of Shale," Acta Geotechnica, published in 2006, 12 pages.
Vanlandingham, "Review of Instrumented Indentation," Journal of Research of the National Institute of Standards and Technology, vol. 108, No. 4, Jul.-Aug. 2003; 17 pages.
Vernik et al., "Ultrasonic Velocity and Anisotropy of Hydrocarbon Source Rocks," Geophysics, vol. 57, No. 5, May 1992, 9 pages.
Walters et al., "Inetic rheology of hydraulic fracturing fluids," SPE Annual Technical Conference and Exhibition, Society of Petroleum Engineers, 2001.
Wang et al. Iron Sulfide Scale Dissolvers: How Effective Are They?, SPE 168063, Society of Petroleum Engineers, presented at the SPE Saudi Arabia section Annual Technical Symposium and Exhibition, May 19-22, 2013, 22 pages.

(56) References Cited

OTHER PUBLICATIONS

Wang et al., "The Flattened Brazilian Disc Specimen Used for Testing Elastic Modulus, Tensile Strength and Fracture Toughness of Brittle Rocks: Analytical and Numerical Results," International Journal of Rock Mechanics and Mining Sciences, vol. 41, Issue 2: pp. 245-253.

Warpinski, "Understanding Hydraulic Fracture Growth, Effectiveness, and Safety Through Microseismic Monitoring," Intech, May 17, 2013, 14 pages.

Wegst et al., "Bioinspined structural materials," Nature Materials, vol. 14, Jan. 2015, 14 pages.

Wenk et al., "Preferred Orientation and Elastic Anisotropy of Illite-Rich Shale," Geophysics, vol. 72, No. 2, Mar.-Apr. 2007, 7 pages.

Wessels et al., "Identifying fault activation during hydraulic stimulation in the Barnett shale: source mechanisms, b values, and energy release analyses of microseismicity," presented at the SEG San Antonio 2011 Annual Meeting, Sep. 18-23, 2011, 5 pages.

Wilson et al., "Fracture testing of bulk silicon microcantilever beams subjected to a side load," Journal of Microelectromechanical Systems, vol. 5, No. 3, Sep. 1996; 9 pages.

Wu et al., "A reusable biosensor chip for SERS-fluorescence dual mode immunoassay," Proc. SPIE 9543, Third International Symposium on Laser Interaction with Matter, 954317, May 4, 2015, 6 pages.

Wu et al., "A SERS-Assisted 3D Barcode Chip for High-Throughput Biosensing," Small Journal vol. 11, No. 23, Jun. 11, 2015, 9 pages.

Wurster et al., "Characterization of the fracture toughness of microsized tungsten single crystal notched specimens," Philosophical Magazine, vol. 92, No. 14, May 2012; 23 pages.

Xu et al.., "Measurement of two-photon excitation cross sections of molecular fluorophores with data from 690 to 1050 nm," Journal of the Optical Society of America B, Mar. 1996, 11 pages.

Zamberi et al., "SPE 166005: Improved Reservoir Surveillance Through Injected Tracers In A Saudi Arabian Field: Case Study," Society of Petroleum Engineers (SPE), presented at SPE Reservoir Characterization and Simulation Conference and Exhibition, Sep. 16-18, 2013, 15 pages.

Zemel, "Chapter 3: Interwell Water Tracers," Tracers in the Oil Field, vol. 43, 1st Edition, Elsevier Science, Jan. 13, 1995, 47 pages.

Zeszotarski et al., "Imaging and Mechanical Property Measurements of Kerogen via Nanoindentation," Geochimica et Cosmochimica Acta, vol. 68, No. 20, Oct. 15, 2004, 7 pages.

Zhou et al., "Upconversion luminescent materials: advances and applications," Chem Rev., Jan. 14, 2015, 71 pages.

GCC Examination Report in Gulf Cooperation Council Appln. No. GC 2018-35234, dated Sep. 25, 2020, 5 pages.

GCC Examination Report in Gulf Cooperation Council Appln. No. GC 2018-35234, dated Jan. 25, 2021, 4 pages.

Abousleiman et al., "GeoGenome Industry Consortium (G2IC) 2004-2006 JIP," The Poromechamcs Institute, 2004, 6 pages.

Goodman, "Introduction to Rock Mechanics," John Wiley & Sons, Chapter 3: Rock Strength and Failure Criteria, Jan. 1989, 21 pages.

"Hydraulic Fracturing Fluid Product Component Information Disclosure," Progress Energy Canada Ltd., Jan. 2012, 2 pages.

\* cited by examiner

SYNTHETIC SOURCE ROCKS

CROSS-REFERENCE TO RELATED APPLICATION

This application claims priority under 35 USC § 119(e) to U.S. Provisional Patent Application Ser. No. 62/500,282, filed on May 2, 2017, the entire content of which is hereby incorporated by reference.

TECHNICAL FIELD

This specification relates to source rocks, particularly to synthetic source rocks.

BACKGROUND

Source rocks are compositionally diverse and complex lithofacies including a lithified composite of detrital and clay minerals comprised of organic matters that include kerogen, bitumen, and pyrobitumen. The diversity and complexity of the interwoven, inorganic and organic, nanoscale matrix presents a challenge in measuring its individual mechanical properties. In particular, measuring the mechanical moduli of the organic materials are difficult because of the uncertainty posed by the composite nature of the source shale rock.

SUMMARY

The present specification describes methods and systems for fabricating synthetic source rocks with organic materials such as kerogen, by utilizing a mixing technology, for example, resonant acoustic mixing technology, and characterizing the synthetic source rocks.

One aspect of the present disclosure features a method of fabricating a synthetic source rock. The method can include preparing one or more organic components including kerogen, mixing the one or more organic components with one or more inorganic components to obtain a mixture, and processing the mixture to fabricate a synthetic source rock. The mixture can be a homogenous mixing of the one or more organic components and the one or more inorganic components.

The one or more organic components with the one or more inorganic components can be mixed by utilizing resonant acoustic waves. The resonant acoustic waves can be configured to generate and maintain a uniform shear field during the mixing. For example, the resonant acoustic waves can be configured to generate an acceleration up to of 100 g at a resonance frequency of 60±1 hertz (Hz), where g is the gravitational acceleration of about 9.8 meter/second squared ($m/s^2$).

The one or more organic components including kerogen can be prepared by isolating the kerogen from a source shale sample, for example, by dissolving or removing mineralogical components from the source shale sample using hydrochloric acid or hydrofluoric acid (HCl/HF). The kerogen can have a maturity within a range from immature to a peak to late stage of hydrocarbon generation. The kerogen can include at least one of type I kerogen, type II kerogen, type II-S kerogen, type III kerogen, and type IV kerogen.

The one or more organic components can include bitumen. The bitumen can be obtained by extracting from a source shale sample with organic solvents or purchasing from commercial sources. In some cases, a combination of bitumen and kerogen can be prepared.

The method can further include preparing the one or more inorganic components. The one or more inorganic components can include one or more mineral materials, for example, at least one of clay mineral material and non-clay mineral material. In some cases, the one or more inorganic components are prepared by obtaining each of the one or more mineral materials in a pure form (for example, with a concentration higher than a predetermined threshold such as 95%) with a respective amount. In some cases, the one or more inorganic components are prepared by obtaining the one or more mineral materials in a mixed form with known components and associated percentages.

The organic components and the inorganic components can be selected based on a predetermined combination of weight or volume percentages. The one or more inorganic components can be pre-mixed to obtain homogenous composite powders.

In some implementations, an inorganic binder is used to bind the one or more organic components and the one or more inorganic components. The inorganic binder can include at least one of a geo-polymer precursor solution, a potassium or sodium silicate solution, and cement.

The mixture can be processed to fabricate a synthetic source rock. For example, the mixture can be first heated in a predetermined mold until solidification, and then the solidified mixture is post-processed to fabricate the synthetic source rock. The synthetic source rock can include a synthetic source shale. The synthetic source rock can have a size at a scale of millimeter, for example, from 1 mm to 100 mm. The synthetic source rock can have a geometry of single edge notched bending (SENB), semi-circular bend (SCB), or compact tension (CT) specimen.

The method can further include characterizing one or more mechanical or chemo-mechanical properties and behaviors of the synthetic source rock as one or more functions of the one or more organic components and the one or more inorganic components. The one or more functions can include a function of the kerogen in terms of maturity, concentration, and type. The characterization can use micro- or nano-scale indentation.

The one or more mechanical or chemo-mechanical properties of the synthetic source rock can include one or more of elastic properties including at least one of Young's modulus, Poisson's ratio, and bulk modulus, plastic properties including at least one of tensile and cohesive strength and friction coefficients, and hydraulic fractures related parameters, including at least one of fracture toughness, stress intensity factor, and energy storage and dissipation. A specimen of the synthetic source rock can be utilized for the characterization. The specimen can have a geometry of single edge notched bending (SENB), semi-circular bend (SCB), or compact tension (CT) specimen. The characterization can be performed by using scanning electron microscope (SEM), X-ray crystallography (XRD), or X-Ray fluorescence (XRF).

In some cases, one or more mechanical properties including fracture toughness of the synthetic source can be characterized as a function of the one or more organic components and the one or more inorganic components. In some cases, one or more mechanical properties including fracture toughness of the synthetic source rock can be characterized as a function of orientation and transverse isotropy of the one or more organic components and the one or more inorganic components. In some cases, crack propagation (straight versus (vs.) tortuous) behavior of the synthetic source rock can be characterized as a function of composition and orientation of the one or more organic components and the one or more inorganic components.

Mechanical properties and behaviors of the one or more organic components of the source rock can be determined. Mechanical properties of properties and behaviors of the one or more inorganic components of the source rock can be determined. Mechanical properties of properties and behaviors of composite materials of organic and inorganic components at different fractions of source rocks can be also determined.

Another aspect of the present disclosure features a method of fabricating synthetic source rocks. The method includes mixing one or more organic components and one or more inorganic components with a kerogen precursor as an organic binder to obtain a mixture including artificial kerogen and processing the mixture to fabricate a synthetic source rock. The kerogen precursor can include at least one of cellulose and lignin.

The mixture can be heated until solidification, and then heat and stress can be applied to the solidified mixture to artificially age the obtained artificial kerogen. The kerogen precursor can be modified to change at least one property of the artificial kerogen.

The one or more organic components can include bitumen, and the one or more inorganic components can include at least one of clay mineral material and non-clay mineral material. The one or more organic components with the one or more inorganic components can be mixed by utilizing resonant acoustic waves. The resonant acoustic waves can be configured to generate a uniform shear field and maintain the field during the mixing, for example, an acceleration of up to 100 g at 60±1 Hz, where g is the gravitational acceleration of about 9.8 m/s$^2$.

A further aspect of the present disclosure features a synthetic source rock including one or more organic components and one or more inorganic components. The one or more organic components include one of type I kerogen with a weight percentage of trace to 75%, type II kerogen with a weight percentage of trace to 75%, type II-S kerogen with a weight percentage of trace to 75%, type III kerogen with a weight percentage of trace to 75%, and type IV kerogen with a weight percentage of trace to 75%. The one or more organic components can include bitumen. The one or more inorganic components can include at least one of clay mineral material and non-clay mineral material.

The details of one or more implementations of the subject matter of this specification are set forth in the accompanying drawings and associated description. Other features, aspects, and advantages of the subject matter will become apparent from the description, the drawings, and the claims.

DETAILED DESCRIPTION

Figure 1:
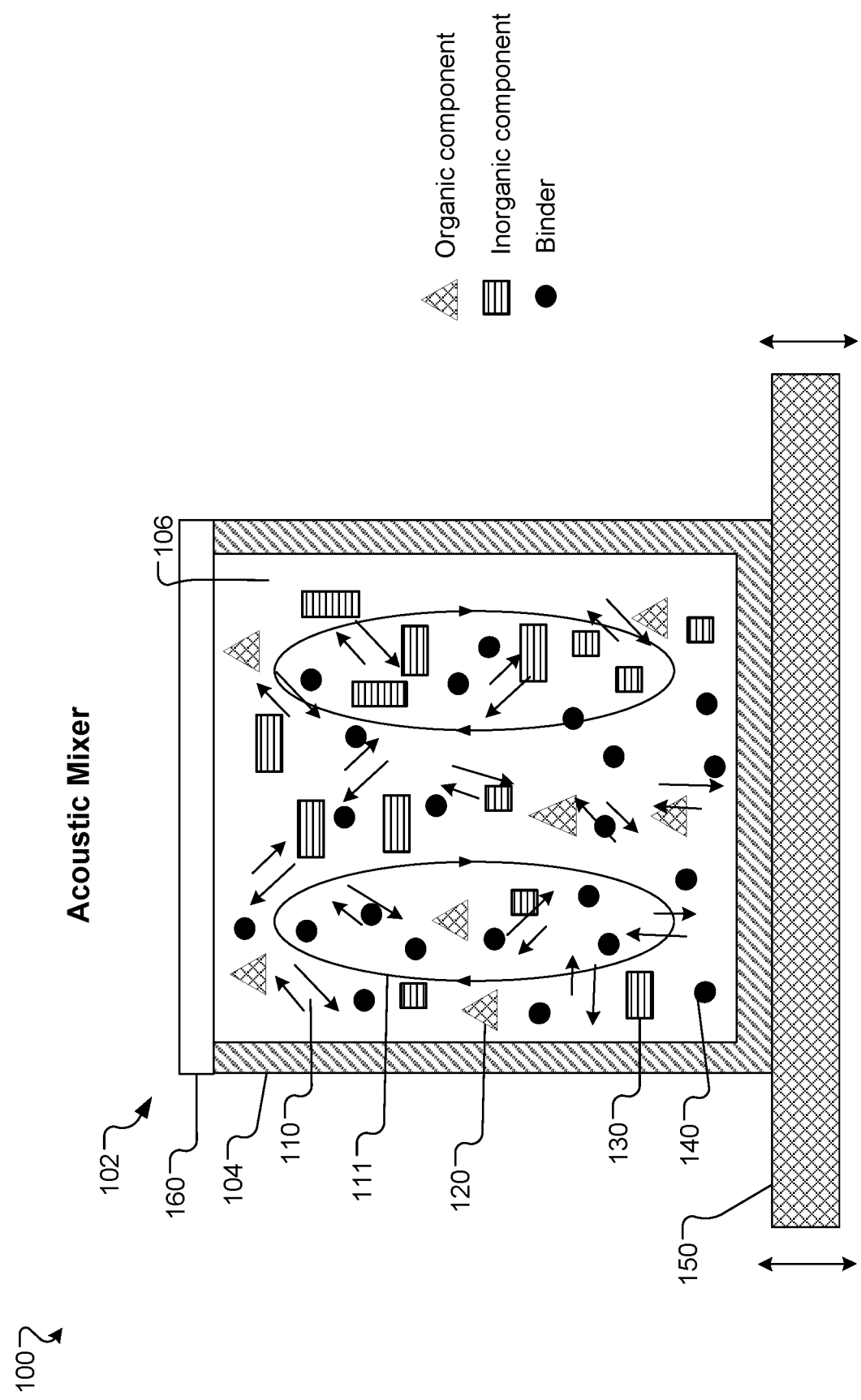
FIG. 1 is a schematic diagram illustrating an example of mixing organic components and inorganic components using an acoustic mixer.

The importance of understanding individual mechanical properties of organic matters in source rocks has been revealed in nanoscale mechanical studies that suggest that kerogen possesses a tensile strength which may lessen an efficiency of hydraulic fracturing processes. Both kerogen and the supporting clay matrix have also been cited as a factor that can influence the ability to create optimal fractures for enhancing source rock well productivity. However, given the complexity of the matrix where the lithofacies can change over a scale of millimeters to meters, understanding the total effect of this phenomenon at the reservoir scale are difficult to estimate or even simulate. To predict whether a hydraulic fracture can propagate or be curtailed because of the composite mechanical attributes of these lithofacies, it is advantageous to understand how each individual matrix component contributes, apart from the whole. However, lack of availability of kerogen in its original state and kerogen rich shale samples to investigate its mechanical behavior is a big challenge.

Implementations of the present specification are generally directed to fabricating synthetic source rocks with organic materials. More particularly, implementations of the present specification are directed to fabricating synthetic shale composites with organic components including kerogen by utilizing high energy resonant acoustic mixing technology, for example, with an acceleration up to 100 g at a resonance frequency of 60±1 Hz. In some implementations, known compositions of organic matter such as isolated kerogen and extracted bitumen, and minerals of known mechanical moduli are selected to fabricate the synthetic shale. In some implementations, a kerogen precursor is used to make kerogen in situ in a reactor or mixer. The kerogen precursor is a compound that can participate in a chemical reaction that produces another compound, that is, kerogen. The transformation of the kerogen precursor into kerogen may occur within a mineral matrix. Heat and pressure may be applied to the overall matrix to ensure that the precursor forms kerogen-like compositions. Examples of kerogen precursors include cellulose or its derivatives, lignin, or both. Synthetic rubbers or polymers that have similar mechanical properties to kerogen, whether pre-formed or prepared in situ, could also substitute for kerogen. Dispersion of the kerogen into a mineral matrix at a particular size and composition followed by processes can provide desired mechanical integrity.

In some implementations, resonant acoustic mixing technology is utilized to disperse the diverse mixture of complex multiphase materials (for example, powders, flakes, high viscosity grains, or paste) with nano-micro scales sizes, which allows for homogenous mixing of highly varied polymeric substances such as kerogen. With this technology, a uniform shear field can be maintained throughout the entire mixing chamber and provide a much faster and more evenly distributed (or homogeneous) mixed product compared to other mixing techniques, for example, impeller, shear mixing, or ultrasonication. Utilizing the acoustic mixing technology allows using a minimum amount of bitumen or kerogen, in granular or liquid state, to fabricate a synthetic shale close to its in-situ state for further systematic investigation with controlled variation of minerals, organic matters, et cetera (etc.). For example, this technology allows mixing with very small amount of materials in an order of 10s of milliliter (mL) that is suitable for working with materials like kerogen, which are very scarce and difficult to extract.

The technologies described in the present specification enable re-engineering source rocks (for example, source shales) with known total organic carbon (TOC) contents, mineral and clay types and compositions at a scale where local heterogeneity reflects the composite properties, which provides an excellent test platform to investigate the effects of the various components on characterizations, for example, mechanical or chemo-mechanical characterizations. The mechanical properties can include stiffness, strength (for example, tensile strength, cohesion, or frictional angle), fracture toughness, energy storage, and dissipation. The synthetic core sized specimens, for example, having 2 inches to 3 inches in diameter, can be about two to three orders of magnitude larger than a typical size of organic matter (for example, kerogen) in length scale, which can enhance the detection of the contribution from the constituents, particularly from the organic matters. In some cases, the technologies enable to start with manufacturing and testing a single phase (mineral/component) of a source shale and then progressively manufacturing and testing composite materials with more phases, such that primary phases/minerals/components responsible for a particular mechanical response and behavior can be identified. For example, tensile softening and toughness may be more related to kerogen and clay content, while Young's modulus may be mainly affected by quartz and composite structures.

The technologies for fabricating synthetic shale rock structure also allow for developing databases for understanding how the various components in a source shale can influence bulk mechanical moduli or fracture toughness, which can be used for designing and optimization of hydraulic fracturing operation and addressing production decline issues. For example, this can aid in developing simulations and prediction methodologies concerning the efficiency of the hydraulic fracture process for source rock reservoirs, for example, in unconventional reservoirs. Synthetic source rocks can be mechanically characterized for plastic properties including cohesion and friction angle, and the database of properties can be incorporated into drilling operations such as wellbore stability planning and predictions. It can also provide information on reservoir compaction and platform subsidence.

FIG. 1 is a schematic diagram illustrating an example 100 of mixing one or more organic components 120 and one or more inorganic components 130 using a resonant acoustic mixer 102. The acoustic mixer 102 can include a vessel 104 defining a mixing chamber 106. The acoustic mixer 102 is configured to cause oscillation or vibration or both within the chamber 106. As a result, the acoustic mixer 102 can introduce high-energy particle-particle interactions for solid granular or powder materials, and acoustic waves for liquid materials. The high intensity energy introduced by the acoustic mixer 102 can cause particle-particle interaction, solid-liquid interaction, and liquid-liquid interaction among the organic components 120 and the inorganic components 130, so that multiphase materials in the organic components 120 and the inorganic components 130 can be mixed with each other to obtain a mixture. The mixture can be in a homogenous form.

In some examples, cluster/assembly of microscale mixing zones 110 (as illustrated by a pair of unequal parallel lines in FIG. 1) are produced uniformly throughout the entire mixing vessel 104, whereas bulk mixing zones 111 (as illustrated by an elliptical curve in FIG. 1) can be also produced from the oscillation and homogenize the mixing media along the vessel 104, for example, vertically. The acoustic mixer 102 can tune a frequency of the oscillation or vibration to match the resonance frequency of the materials to be mixed including the organic components 120 and the inorganic components 130, such that the materials are mixed at the resonance frequency maximizing the transfer of the acoustic energy. The resonance frequency can be nominally at around 60±1 Hz.

In some implementations, the acoustic mixer 102 includes an oscillating plate 150 as an acoustic wave generator on a bottom of the vessel 104. A corresponding reflector 160 can be arranged opposite to the acoustic wave generator 150, for example, the reflector 160 can be a cover on top of the vessel 104. The vessel 104 can be positioned on top of the oscillating plate 150. The acoustic mixer 102 is configured to induce oscillations or vibrations, for example, by the oscillating plate 150 or the reflector 160 or both, such that the oscillations are resonant within the chamber 106 with one or more materials of the organic components 120 and the inorganic materials 130. The oscillating plate 150 can have an operating frequency of 60±1 Hz.

In some examples, the oscillating plate 150 imparts high acceleration, for example, up to 100 g, where g is the gravitational acceleration of about 9.8 m/s$^2$, to the mixing media in the chamber 106, which causes an immense shear energy between interacting particles or liquid mass that depends upon their mass (such as size, density) and contact surface area. The immense shear energy can produce a uniform shear field within the chamber 106. For example, the immense shear energy or uniform shear field produces the cluster/assembly of microscale mixing zones 110 that are uniformly throughout the entire mixing vessel 104 and the bulk mixing zones 111 that can homogenize the mixing media along the vessel 104. The acoustic mixer 102 can maintain the uniform shear field during mixing the organic components 120 and the inorganic components 130.

In some implementations, the acoustic mixer 102 includes a mixing jar (not shown) configured to reciprocally move up and down within the chamber 106, for example, at a frequency of about 60±1 Hz.

In some examples, the one or more organic components 120 includes kerogen. As discussed later in FIG. 2, the kerogen can be retrieved or isolated from source shale samples. Before putting in the acoustic mixer 102, the kerogen can be in a granular state, and can have nanometer (nm) to micrometer (μm) sizes, for example, from 10s of nanometers to 100s of micrometers. The kerogen can have a maturity ranging from immature, to peak to late stages of hydrocarbon generation. For example, the kerogen maturity can be in the peak to late oil window or in an early gas window.

The stage of maturity of kerogen found in a source rock can be defined by using methods such as vitrinite reflectance, pyrolysis or elemental analysis. These methods represent destructive analytical techniques.

In some implementations, vitrinite reflectance is employed to determine kerogen maturity. Vitrinite reflectance (% Ro) microscopically measures the intensity of reflected light from vitrinite found in kerogen in polished rock particles immersed in oil to determine maturity. The difference in reflectance from vitrinite particles observed and recorded provides a measure of the maturity of kerogen. Table 1 shows a relationship between % Ro values and different stages of maturity.

TABLE 1

Relationship between % Ro values and stages of maturity

| % Ro value | Stage of maturity |
|---|---|
| 0.20-0.60 | Immature |
| 0.60-0.65 | Early Maturity |
| 0.65-0.90 | Peak Maturity |

TABLE 1-continued

Relationship between % Ro values and stages of maturity

| % Ro value | Stage of maturity |
|---|---|
| 0.90-1.35 | Late Maturity |
| >1.35 | Post Maturity |

In some implementations, pyrolysis is employed to determine kerogen maturity, for example, in the case of minimal time and sample preparation required to run the analysis. In pyrolysis, kerogen is subjected to a programmed temperature where it is thermally decomposed over time and the resulting by-products of this decomposition are measured via a flame ionization detector. During the pyrolysis analysis, a maximum temperature of complete combustion is reached and a pyrogram is produced that records the hydrocarbon generative potential of the kerogen, both of which can be used to define the maturity. For example, maximum temperatures known as Tmax values can be used to define different stages of maturity. Table 2 shows a relationship between maximum temperatures Tmax values and stages of maturity.

TABLE 2

Relationship between Tmax values and stages of maturity

| Tmax value | Stage of maturity |
|---|---|
| <435° C. | Immature |
| 435-445° C. | Early Maturity |
| 445-450° C. | Peak Maturity |
| 450-470° C. | Late Maturity |
| >470° C. | Post Maturity |

In some implementations, elemental analysis provides quantification of the hydrogen, carbon, oxygen nitrogen and sulfur content of kerogen. Because kerogen loses hydrogen as it is transformed into hydrocarbons, monitoring the changes in hydrogen relative to the carbon (H/C) can be considered an indication of maturity. Thus, the H/C ratio of kerogen can be a reliable and accurate technique for determining maturity provided the kerogen type is known. Table 3 shows a relationship between H/C values and different stages of maturity.

TABLE 3

Relationship between H/C values and stages of maturity

| H/C value | Stage of maturity |
|---|---|
| >1.5 | Immature |
| 1.2-1.5 | Early Maturity |
| 1.0-1.2 | Peak Maturity |
| 0.7-1.0 | Late Maturity |
| <0.7 | Post Maturity |

Kerogen can be classified according to types which are directly related to the relative percentages of these macerals found composing the kerogen structure. For example, Type I kerogen is dominated by liptinites that possess well defined cellular structures called telalginites (with H/C value of 1.7-2.00). These can be either of lacustrian or marine origin.

Kerogen dominated by liptinite macerals that are amorphous with not well defined cellular structures known as lamalginites is classified as Type II kerogen (with H/C value of 1.2-1.5). This kerogen is mainly of marine origin, but it may contain liptinites of terrestrial origin such as leaf cuticles and spore cases.

Type II-S kerogen is a subclassification of Type II kerogen. It is also dominated by marine liptinites, but gains increasing sulfur concentrations due to being deposited in a marine carbonate environment. Sulfur is incorporated into the kerogen because the sulfide from the water column is not removed and iron is not readily available at the sediment water interface to form iron sulfide mineral phases, such as pyrite.

Kerogen dominated by vitrinite with inertinite includes organic matter from terrestrial sources of wood and cellulose debris which compose coals (with H/C value of 0.7-1.0) is classified as Type III kerogen.

Type IV kerogen is dominated by inertinite. Inertinite are macerals composed of oxidized organic debris comprised of biochar from forest fires, fragments from bacterial and fungal decomposition and weathered wood from riverine transport.

In some examples, the one or more organic components 120 includes bitumen. As discussed later in FIG. 2, the bitumen can be extracted from source shale samples. The bitumen can be a soluble organic matter. Before putting in the acoustic mixer 102, the bitumen can be in a liquid state. In some examples, the one or more organic components 120 includes pyrobitumen.

The one or more inorganic components 130 can include one or more mineral materials, for example, clay and non-clay mineral materials. The mineral materials can include clays such as kaolinite, muscovite, illite, or montmorillonite-smectite, and non-clay materials such as quartz, feldspar and other silicates, pyrite, calcite, or dolomite. Before being put in the acoustic mixer 102 for mixing with the organic components 120, the mineral materials can be obtained in either pure or mixed form and be well characterized such that the mineral composition is known. The mineral materials can be pre-mixed, for example, using ball mill and acoustic mixing, to obtain homogeneous composite powders. Grain sizes of the powders can range from 10s of nm to 100s of μm.

The one or more organic components 120 and the one or more inorganic components 130 can be selected based on a desired combination of weight or volume percentages or both and combined in the acoustic mixer 102 to incorporate with each other. In some examples, a binder 140 is mixed with the organic components 120 and the inorganic components 130 and configured to bind the organic components 120 and the inorganic components 130. The binder 140 can be an inorganic binder such as a geo-polymer precursor solution, a potassium or sodium silicate solution, or cement.

In some implementations, as discussed later in FIG. 3, organic matter in the organic components 120 is fabricated artificially. For example, instead of being extracted from source shale samples, artificial kerogen can be generated from a kerogen precursor in-situ during mixing in the acoustic mixer 102. The kerogen precursor can be used as an organic binder configured to bind with the inorganic components 130 or one or more other organic components 120 such as bitumen or both. In some examples, the kerogen precursor includes cellulose or its derivatives such as lignin or both.

In some cases, the binder 140 includes both the inorganic binder and the organic binder like the kerogen precursor. The one or more organic components 120 can include both extracted kerogen and the artificial kerogen generated in situ from the kerogen precursor.

In some cases, the mixture can be in a non-homogeneous form, depending on when the components are injected and the frequency of the acoustic waves or the moving frequency of the moving jar in the acoustic mixer 102 or both.

For illustration only, in FIG. 1, the acoustic mixer 102 is used. Other devices configured to generate high-energy intensity, for example, with an acceleration up to 100 g (g is the gravitational acceleration ~9.8 m/s$^2$), in a mixing chamber can be also utilized for mixing the organic components 120 and the inorganic components 130.

Figure 2:
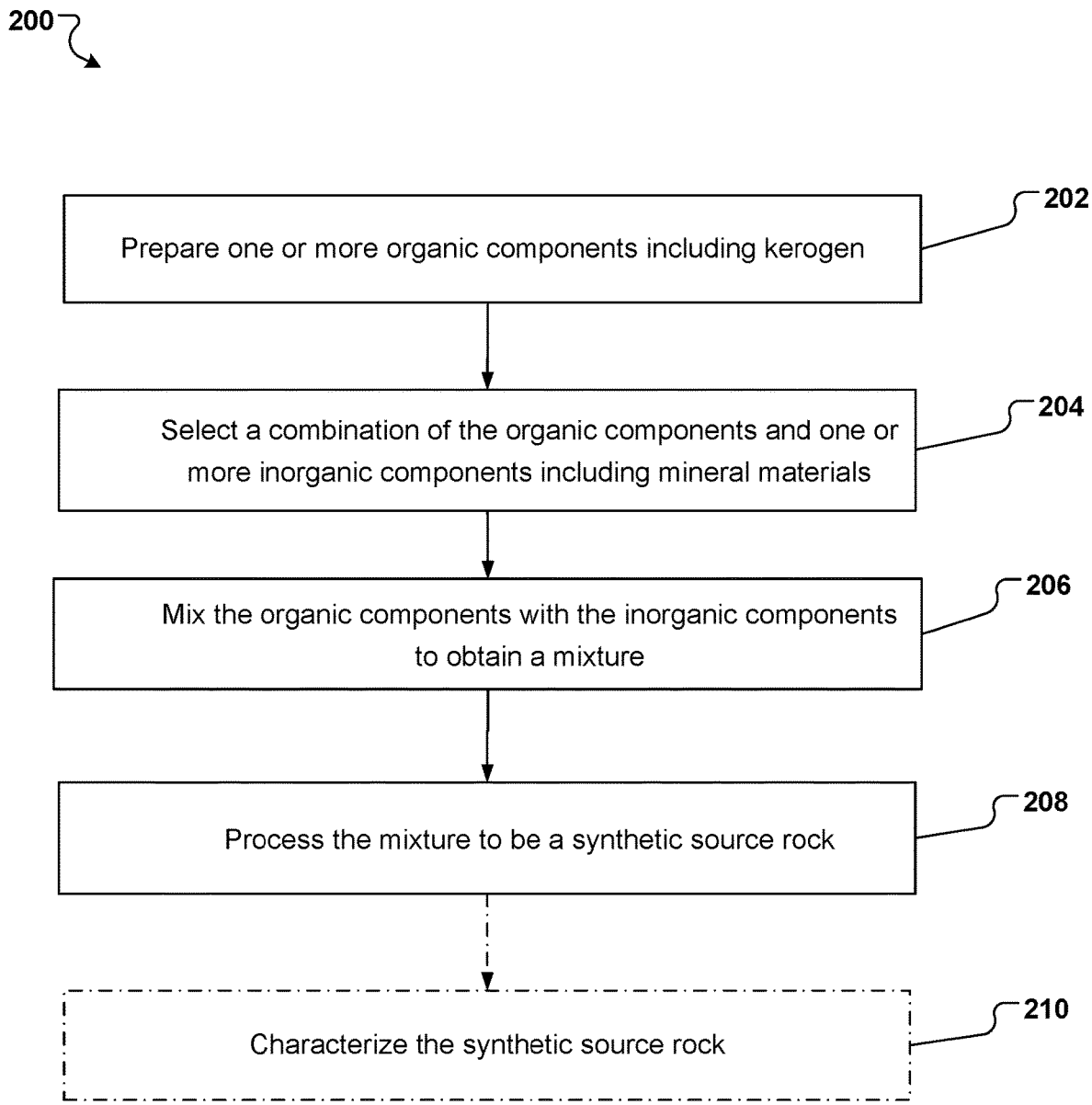
FIG. 2 is a flowchart of an example process of fabricating a synthetic source rock.

FIG. 2 is a flowchart of an example process 200 of fabricating a synthetic source rock, for example, a synthetic source shale.

One or more organic components including kerogen are prepared (202). The organic components can be, for example, the organic components 120 of FIG. 1. In some examples, preparing one or more organic components including kerogen includes isolating the kerogen from a source shale sample, for example, a cored and retrieved source shale sample. Isolating the kerogen from the source shale sample can include dissolving or removing mineralogical components from the source shale sample by using hydrochloric acid or hydrofluoric acid (HCl/HF). The prepared kerogen can be granular kerogen with sizes ranging from 10s of nanometers to 100s of micrometers. The kerogen can have a maturity within a range from immature to a peak to late stage of hydrocarbon generation. In a preferable example, the kerogen maturity is in the peak to late oil window or an early gas window. The kerogen can include at least one of type I kerogen, type II kerogen, type II-S kerogen, type III kerogen, and type IV kerogen.

The one or more organic components can include bitumen. The bitumen is soluble organic matter. The prepared bitumen can be liquid bitumen. In some examples, preparing the one or more organic components includes extracting the bitumen from a source shale sample with organic solvents, for example, carbon tetrachloride, chloroform, methylene chloride, tetrahydrofuran, benzene, toluene, xylenes, acetone, hexanes, or pyridine. In some examples, preparing the one or more organic components includes obtaining the bitumen, for example, commercially. In some examples, preparing the one or more organic components includes extracting bitumen from mined tar sands. In some examples, preparing the one or more organic components includes preparing a combination of bitumen and kerogen. For example, the combination of bitumen and kerogen can be prepared by extracting bitumen and then isolating kerogen.

In some implementations, the process 200 includes preparing one or more inorganic components for fabricating the synthetic source rock. The one or more inorganic components can be similar to the inorganic components 130 of FIG. 1. The inorganic component can include one or more mineral materials. As discussed before, the mineral materials can include clay and non-clay materials. In some examples, preparing the inorganic components includes obtaining each of the one or more mineral materials in a pure form with known quantities. In some examples, preparing the inorganic components includes obtaining the one or more mineral materials in a mixed form with known components and associated percentages. In some examples, preparing the inorganic components includes pre-mixing the inorganic components, for example, the mineral materials, to obtain homogenous composite powders, for example, by using ball mill or acoustic mixing or both. Grain sizes of the powders can range from 10s of nanometers to 100s of micrometers.

The organic components and the inorganic components are selected based on a combination of weight or volume percentages (204). The combination can be predetermined such that respective percentages of individual matters in the fabricated synthetic source rock can be determined and further be associated with respective properties of the fabricated synthetic source rock, as discussed later.

The organic components and the inorganic components are mixed to obtain a mixture (206). As discussed earlier, the mixing can be performed in an acoustic mixer, for example, the acoustic mixer 102 of FIG. 1. An inorganic binder can be put in the acoustic mixer and configured to bind the organic components and the inorganic components during the mixing. The inorganic binder can include at least one of a geo-polymer precursor solution, a potassium or sodium silicate solution, and cement.

Mixing the one or more organic components with the one or more inorganic components can include mixing by utilizing micro mixing 110 and bulk mixing 111 at resonant frequency of FIG. 1. The resonant acoustic waves are configured to generate and maintain a uniform shear field during the mixing. In some examples, the resonant acoustic waves generate an acceleration up to 100 g (g is the gravitational acceleration ~9.8 m/s$^2$). The mixture can be a homogenous mixing of the organic components and the inorganic components.

The mixture is processed to fabricate a synthetic source rock (208). In some examples, processing the mixture to fabricate the synthetic source rock includes heating the mixture in a predetermined mold until solidification and post-processing the solidified mixture to fabricate the synthetic source rock. For example, the mixture can be transferred to a mold of desired size and shape to form a solid. The mold can be preheated. The mold and the mixture can be heated together in an oven until solidification. Heating can be for the binder curing process. For example, geo-polymers as the inorganic binder can be cured at a temperature, for example, much less than 100° C. such as 20° C. The post-processing the solidified mixture to fabricate the synthetic source rock can include pressing, compaction, milling, pressing, extrusion, heating, sintering, or any combination thereof. The pressure applied for compaction in confined condition can be up to 100,000 psi. The fabricated synthetic source rock can have a size at a scale of millimeter (mm), for example, 1 mm to 100 mm in length scale. The synthetic source rock can be close to or less than one to two orders of magnitude larger than a typical size of organic matter (for example, ~10-500 μm string of kerogen) in length scale, which can enhance a detection of contribution from individual ingredient matters or constituents. In some cases, the fabricated synthetic source rock has the same size and shape at which characterization tests are made. In some cases, the fabricated synthetic source rock has a larger size than a testing specimen or different shape from a testing specimen and is cut into smaller pieces with specific geometries for the characterization tests.

The process 200 can include characterizing the fabricated synthetic source rock (210). In some implementations, the fabricated source rock is cut into samples of desired shapes and sizes, such as single edge notched bending (SENB), semi-circular bend (SCB) or compact tension (CT) specimen, and each can be subjected to the same or different characterization tests such as measurement of fracture toughness. Characterizing the fabricated synthetic source rock can include characterizing one or more mechanical or chemo-mechanical properties/behaviors of the synthetic source rock as one or more functions of the one or more organic components and the one or more inorganic components. Characterizing one or more mechanical or chemo-mechanical properties/behaviors of the synthetic source rock can include using micro or nano-scale indentation. The one or more functions include a function of the kerogen in terms of maturity, concentration, and type.

In some implementations. the synthetic source rock is characterized by techniques such as scanning electron microscope (SEM), X-ray crystallography (XRD), or X-Ray fluorescence (XRF). The techniques can be used to prepare millimeter (mm) sizes of specimens to test for mechanical properties like Young's modulus, Poisson's ratio, bulk modulus, in addition to plastic properties such as tensile and cohesive strength, friction coefficients, and hydraulic fractures related parameters, such as fracture toughness, stress intensity factor, in addition to energy storage and dissipation. Small specimens of the synthetic source rock in the scale of mm can also be prepared and tested via nanoindentation and miniaturized loading fixtures (for example, three-point bending) for examining the nano/micro-scale mechanical properties, including studying the transverse isotropy and the scale at which bulk mechanical properties are obtained. These parameters and properties can be measured as a function of organic matters (kerogen or bitumen or both, kerogen type I, II, II-S, III or IV, kerogen maturity, or TOC percentage), mineral types and compositions, or any combinations thereof.

Figure 3:
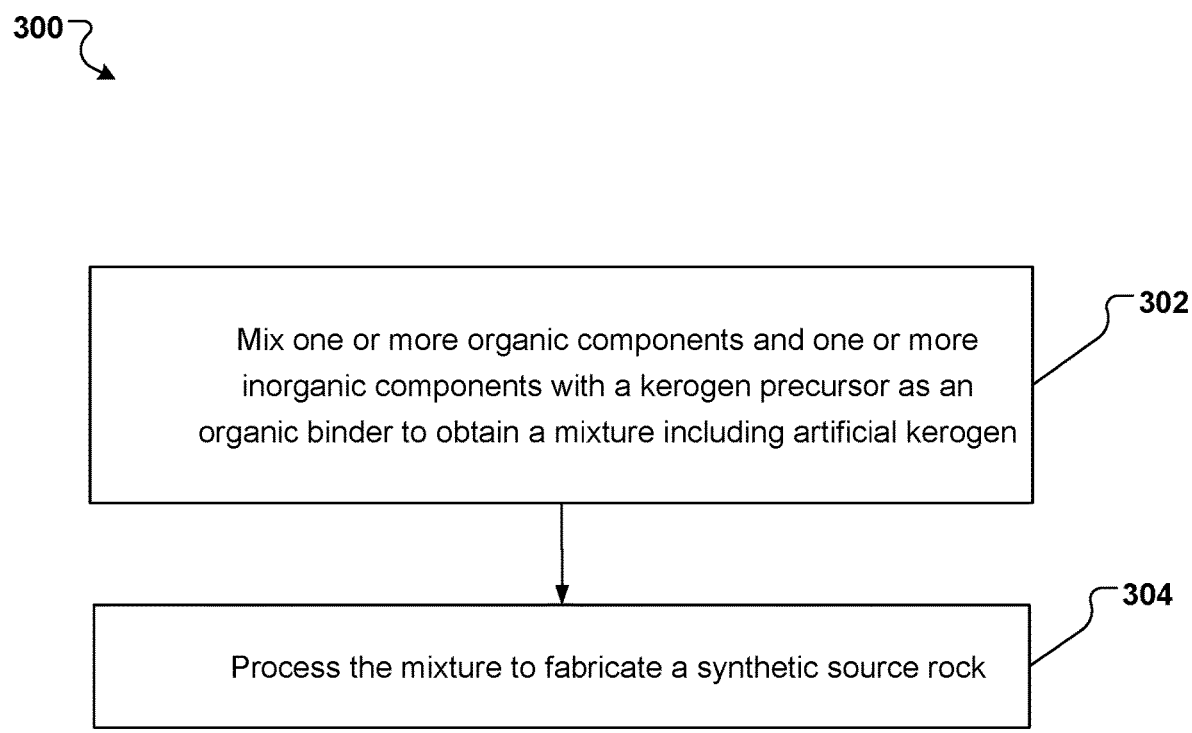
FIG. 3 is a flowchart of another example process of fabricating a synthetic source rock.

FIG. 3 is a flowchart of another example process 300 of fabricating a synthetic source rock. Compared to FIG. 2, where the kerogen is extracted or recovered from source shale samples, the process 300 fabricates artificial kerogen from a kerogen precursor. As discussed earlier, the kerogen precursor can include at least one of cellulose and lignin.

One or more organic components and one or more inorganic components with the kerogen precursor as an organic binder are mixed to obtain a mixture including artificial kerogen (302). The one or more organic components can include bitumen, for example, in a liquid state. In some cases, the organic components do not include isolated kerogen powder, for example, extracted kerogen in a granular state. The one or more inorganic components can be similar to the inorganic components 130 of FIG. 1 and can include clay and non-clay mineral materials.

In some examples, the organic components, the inorganic components, and the kerogen precursor are combined in an acoustic mixer, for example, the acoustic mixer 102 of FIG. 1, and mixed by utilizing resonant acoustic waves, for example, the resonant acoustic waves 110 of FIG. 1. The resonant acoustic waves can be configured to generate a uniform shear field with an acceleration up to 100 g and maintain the uniform shear field during the mixing. The mixture can be homogenous or non-homogenous. The mixture can include the artificial kerogen generated from the kerogen precursor. The synthetic kerogen can be produced before acoustic mixing or after acoustic mixing. Preparation of synthetic kerogen can be made by acoustic mixing and heat.

The mixture is processed to fabricate a synthetic source rock (304). The step 304 can be similar to the step 208 of FIG. 2. After the mixture is prepared with the acoustic mixer, the mixture can be put in a mold of desired size and shape and heated together with the mold in an oven until solidification. After the mixture is solidified, heat and stress can be applied to the solidified mixture to artificially age the obtained artificial kerogen. In some cases, as sulfur and oxygen content changes are important during early diagenesis, the process 300 can include modifying the kerogen precursor to change at least one property of the artificial kerogen, for example, to create proper chemistry for mimicking kerogen in natural source shales or exaggerating kerogen concentration in the natural source shales.

In some implementations, a synthetic source rock includes one or more organic components and one or more inorganic components. The one or more organic components can be similar to the organic components 120 of FIG. 1. The one or more inorganic components can be similar to the inorganic components 130 of FIG. 1. The synthetic source rock can be fabricated by process 200 of FIG. 2 or process 300 of FIG. 3.

The one or more organic components can include kerogen with a concentration higher than a maximum concentration of kerogen in nature source rocks. In some cases, the one or more organic components include type I kerogen with a weight percentage of trace to 75%. In some cases, the one or more organic components include type II kerogen with a weight percentage of trace to 75%. In some cases, the one or more organic components include type II-S kerogen with a weight percentage of trace to 75%. In some cases, the one or more organic components include type III kerogen with a weight percentage of trace to 75%. In some cases, the one or more organic components include type IV kerogen with a weight percentage of trace to 75%.

In some examples, the one or more organic components include bitumen. The one or more inorganic components can include clay and non-clay mineral materials.

The earlier provided description of example implementations does not define or constrain this specification. Other changes, substitutions, and alterations are also possible without departing from the spirit and scope of this specification. Accordingly, other embodiments are within the scope of the following claims.

The invention claimed is:

1. A method comprising:
  preparing one or more organic components including kerogen;
  mixing, by utilizing resonant acoustic waves, the one or more organic components with one or more inorganic components to obtain a mixture;
  processing the mixture to fabricate a synthetic source rock; and
  characterizing one or more mechanical or chemo-mechanical properties and behaviors of the synthetic source rock as one or more functions of the one or more organic components and the one or more inorganic components.

2. The method of claim 1, wherein the resonant acoustic waves are configured to generate and maintain a uniform shear field during the mixing.

3. The method of claim 1, wherein the resonant acoustic waves are configured to generate an acceleration of about 100 g at a resonance frequency of 60±1 Hertz (Hz), where g is the gravitational acceleration of about 9.8 meter per second squared ($m/s^2$).

4. The method of claim 1, wherein preparing one or more organic components including kerogen comprises:
  isolating the kerogen from a source shale sample.

5. The method of claim 4, wherein the kerogen has a maturity within a range from immature to a peak to late stage of hydrocarbon generation, and
  wherein the kerogen includes at least one of type I kerogen, type II kerogen, type II-S kerogen, type III kerogen, and type IV kerogen.

6. The method of claim 1, wherein the one or more organic components further include bitumen, and wherein preparing one or more organic components comprises at least one of:

extracting the bitumen from a source shale sample with organic solvents, and preparing a combination of bitumen and kerogen.

7. The method of claim 1, further comprising preparing the one or more inorganic components, wherein the one or more inorganic components comprise one or more mineral materials including at least one of clay material and non-clay material.

8. The method of claim 7, wherein preparing the one or more inorganic components comprises one of:
obtaining each of the one or more mineral materials in a pure form with a respective amount, and
obtaining the one or more mineral materials in a mixed form with components having respective percentages.

9. The method of claim 1, further comprising:
pre-mixing the one or more inorganic components to obtain homogenous composite powders.

10. The method of claim 1, wherein mixing the one or more organic components with one or more inorganic components comprises:
combining the one or more organic components and the one or more inorganic components with an inorganic binder.

11. The method of claim 10, wherein the inorganic binder comprises at least one of a geo-polymer precursor solution, a potassium or sodium silicate solution, and cement.

12. The method of claim 1, wherein processing the mixture to fabricate a synthetic source rock comprises:
heating the mixture in a predetermined mold until solidification; and
post-processing the solidified mixture to fabricate the synthetic source rock.

13. The method of claim 1, wherein the synthetic source rock comprises a synthetic source shale having a size within a range from 1 millimeter to 100 millimeters.

14. The method of claim 1, wherein characterizing one or more mechanical or chemo-mechanical properties and behaviors of the synthetic source rock comprises:
using micro- or nano-scale indentation.

15. The method of claim 1, where characterizing one or more mechanical or chemo-mechanical properties and behaviors of the synthetic source rock comprises: preparing a specimen of the synthetic source rock, the specimen having a geometry of single edge notched bending (SENB), semi-circular bend (SCB), or compact tension (CT) specimen.

16. The method of claim 1, wherein the one or more mechanical or chemo-mechanical properties of the synthetic source rock comprise at least one of:
elastic properties including at least one of Young's modulus, Poisson's ratio, and bulk modulus,
plastic properties including at least one of tensile and cohesive strength and friction coefficients, and
hydraulic fractures related parameters, including at least one of fracture toughness, stress intensity factor, and energy storage and dissipation.

17. The method of claim 1, wherein characterizing one or more mechanical or chemo-mechanical properties and behaviors of the synthetic source rock comprises at least one of:
characterizing one or more mechanical properties including fracture toughness of the synthetic source as a function of the one or more organic components and the one or more inorganic components,
characterizing one or more mechanical properties including fracture toughness of the synthetic source rock as a function of orientation and transverse isotropy of the one or more organic components and the one or more inorganic components, and
characterizing crack propagation (straight vs. tortuous) behavior of the synthetic source rock as a function of composition and orientation of the one or more organic components and the one or more inorganic components.

18. The method of claim 1, wherein the one or more functions comprise a function of the kerogen in terms of maturity, concentration, and type.

19. The method of claim 1, further comprising at least one of:
determining mechanical properties and behaviors of the one or more organic components of the source rock,
determining mechanical properties of properties and behaviors of the one or more inorganic components of source rock, and
determining mechanical properties of properties and behaviors of composite materials of organic and inorganic components at different fractions of source rocks.

* * * * *